June 12, 1956 E. S. BECKETTE 2,749,848
RAILWAY TRUCK STRUCTURE
Filed Nov. 28, 1951 3 Sheets-Sheet 1
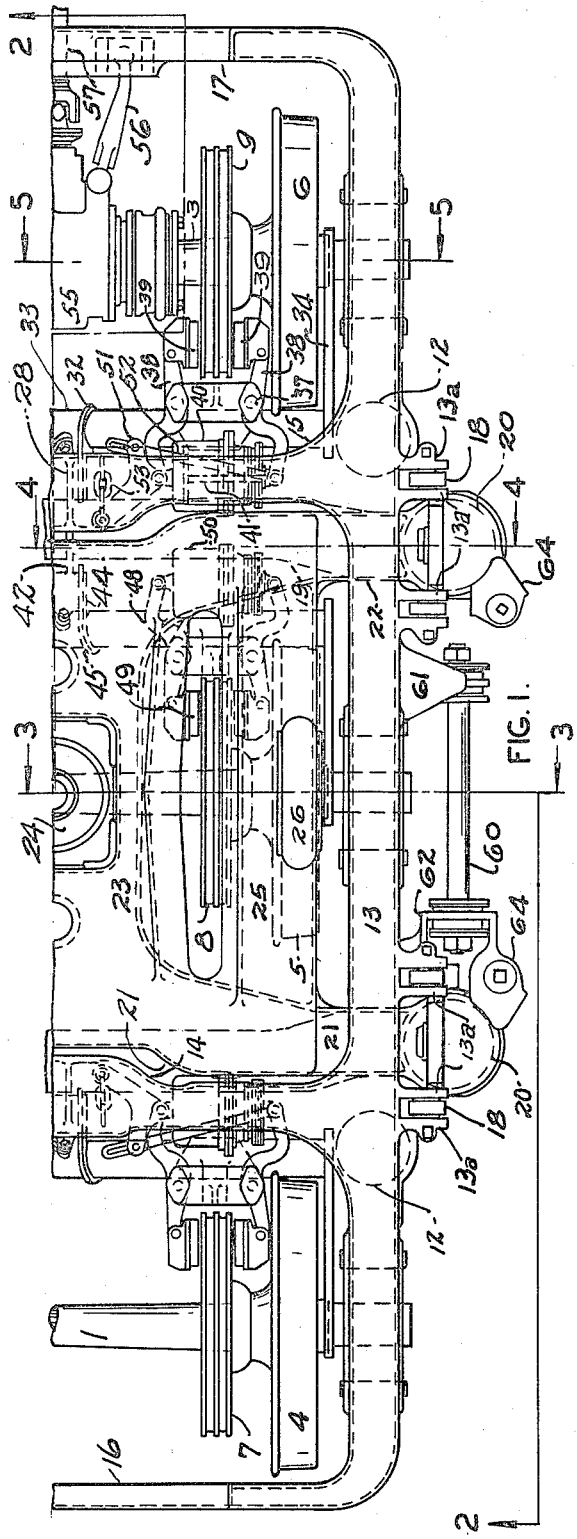
FIG. 1.
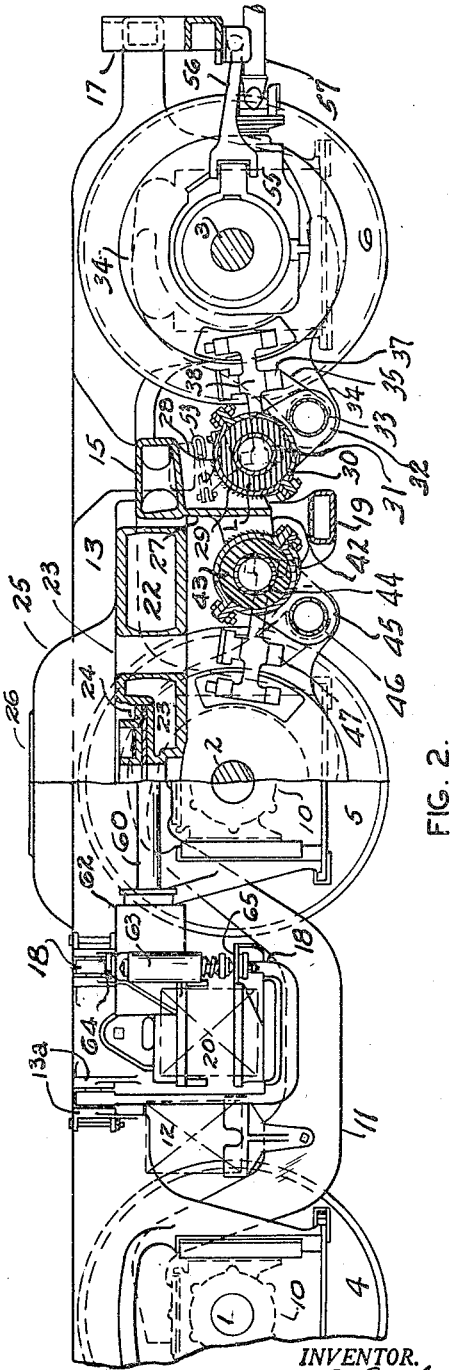
FIG. 2.
INVENTOR.
Edmund S. Beckette
BY Rodney Bedell
atty.

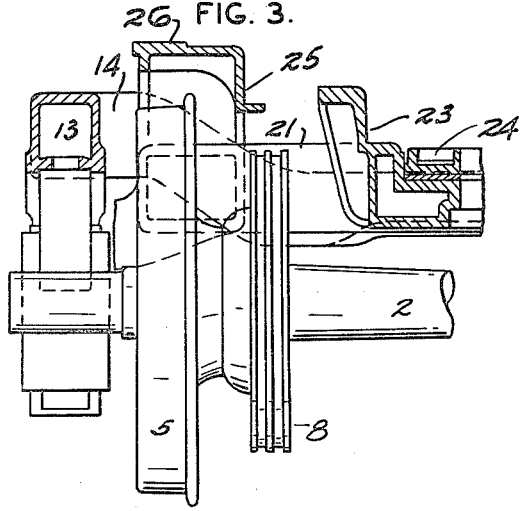

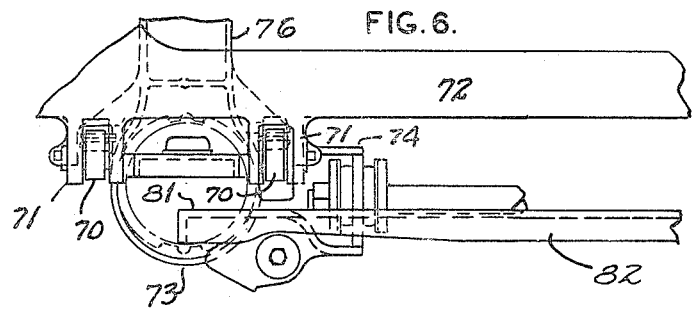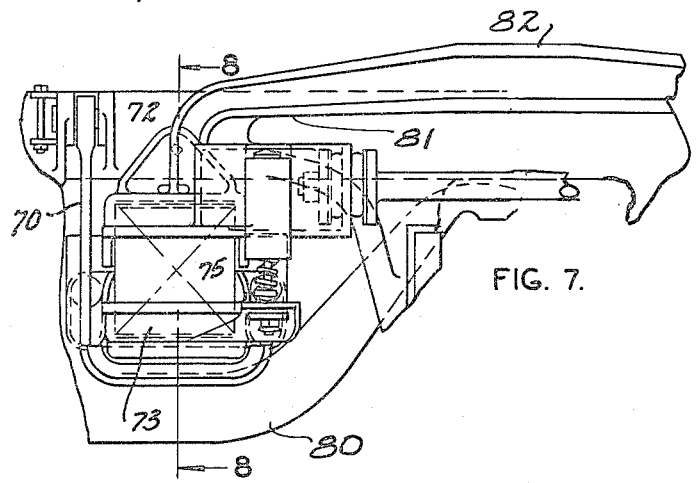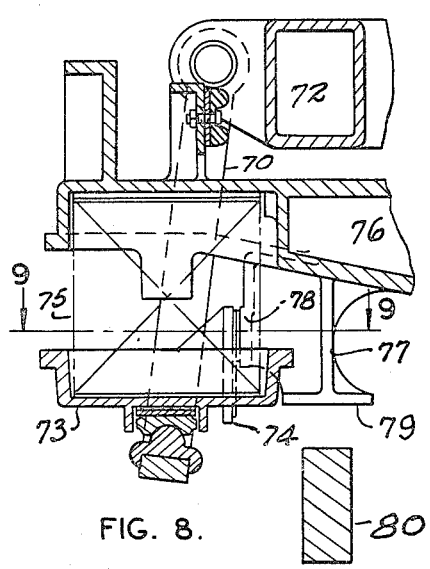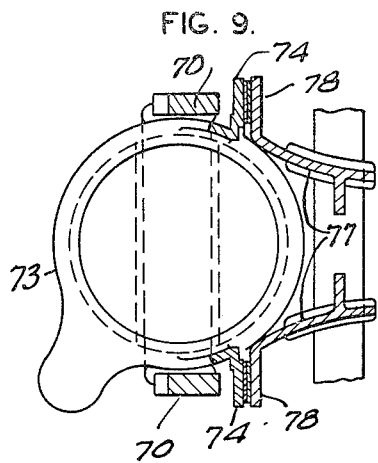

United States Patent Office 2,749,848
Patented June 12, 1956

2,749,848
RAILWAY TRUCK STRUCTURE

Edmund S. Beckette, East St. Louis, Ill., assignor to General Steel Castings Corporation, Granite City, Ill., a corporation of Delaware Application November 28, 1951, Serial No. 258,593

19 Claims. (Cl. 105—188)

The invention relates to railway rolling stock and more particularly to six wheel trucks equipped with brakes of the type in which friction shoes are applied to discs on the axles or wheels and positioned between the wheels, as distinguished from the usual brake arrangement in which shoes are applied to the treads of the wheels.

Previously disc type brakes have been used on both wheel and axle assemblies of four wheel trucks and it would be feasible to apply disc brakes on the end wheel and axle assemblies only of six wheel trucks of the usual type. Such use on six wheel trucks would require a longer wheel base than the usual six wheel truck equipped with wheel engaging brakes. In six wheel trucks it is important to keep the overall wheel base of each truck as short as practical to enable the truck to negotiate curved track without too great overhang from center plate to the end of car. It is important also to maintain proper spacing between the trucks at opposite ends of the vehicle relative to the rail lengths so as to prevent a wheel on one truck at one side of the car from striking the rail joint at the same time a wheel on the other truck on the other side of the car strikes a rail joint. The rail joints on opposite sides are usually staggered to prevent this. In six wheel trucks if the wheel base is long enough the mounting of air cylinders and operating mechanism for disc brakes between the wheels at opposite sides of the truck may be followed in connection with the end wheel and axle assemblies, but in the usual design of a six wheel truck which has the truck bolster supported from portions of the frame inwardly of the wheel pieces, the inclusion of disc brake structure in connection with the middle wheel and axle assembly is likely to interfere with the truck bolster and its mounting on the truck frame and with the truck side bearings.

The main object of the present invention is to provide for the application of disc brakes to a six wheel truck having a minimum wheel base and with the brake operating mechanism supported by the truck frame at points inwardly of the end wheel and axle assemblies rather than outwardly, and so as to reduce to a minimum the possibility of the truck frame tilting in a vertical longitudinal plane due to forces applied to the frame when the brake mechanisms are applied to the brake discs.

Another object of the present invention is to provide for the application of disc brakes to the middle wheel and axle assembly of a six wheel truck, as well as to the end wheel and axle assemblies, while retaining the lateral motion bolster commonly provided in such a truck and without lengthening the truck wheel base because of the inclusion of three sets of disc brakes.

Another object is to include disc brakes in each wheel and axle assembly of a six wheel truck without interfering with the mounting of a generator drive on one of the end wheel and axle assemblies.

Another object is to avoid the application of brake torque forces to the ends of the truck frame so as to avoid excessive tilting of the truck frame in a longitudinal plane when the brakes are applied, as would occur if the brake operating mechanisms were mounted on the ends of the truck frame.

In general, these objects are attained by mounting the brake mechanism for one end wheel and axle assembly and for the middle wheel and axle assembly on opposite sides of one of the frame center transoms, shaping the transom and locating associated devices to clear adjacent truck structure so as to avoid interference between the brake mechanism and other truck parts.

In the accompanying drawings illustrating the invention,

Figure 1 is a top view of one longitudinal half of a six wheel truck.

Figure 2 is in part a side elevation and in part a longitudinal vertical section taken approximately on the line 2—2 of Figure 1.

Figures 3, 4, and 5 are vertical transverse sections taken on the corresponding section lines of Figure 1, a generator drive gear housing being omitted in Figure 5 to better illustrate the remaining parts.

Figure 6 is a top view of a portion of a truck embodying another form of the invention.

Figure 7 is a side elevation of the structure shown in Figure 6.

Figure 8 is a vertical transverse section taken on the line 8—8 of Figure 7.

Figure 9 is a detail horizontal section taken on the line 9—9 of Figure 8.

Figure 10 corresponds to Figure 8 but illustrates another form of the invention.

The truck includes three assemblies of axles 1, 2, 3 with the respective wheels 4, 5, 6. Each axle assembly carries a brake disc 7, 8, 9 respectively, adjacent to each of its wheels. Journal boxes 10 on the ends of the axles support the ends of drop equalizers 11, which in turn mount coil springs 12 which carry the truck frame. The truck frame includes wheel pieces 13 at the sides of the truck, transverse center transoms 14, 15 and end transoms 16, 17. Swing hangers 18 are suspended from brackets 13a projecting outwardly from wheel pieces 13 and are arranged in pairs and support spring planks 19 extending transversely of the truck and beyond wheel pieces 13 and equalizers 11 and mount bolster springs 20. The bolster has a general H-shape (Figure 1) with cross arms 21, 22 supported upon springs 20. A longitudinal central member 23 of the bolster extends between cross arms 21, 22 and mounts the body supporting center plate 24. Bolster side members 25 extend between cross arms 21, 22 and mount the side bearings 26 which limit lateral tilting of the vehicle body on center plate 24. The upper portion of center member 23 is depressed to receive the center plate 24 and to support the vehicle body at a low level. Side members 25 are elevated near the middle of the truck to clear the wheels and brake discs. The cross arms 21, 22 of the bolster are offset inwardly at their middle portion to clear the offset middle portion of the truck frame transom as indicated in Figure 1. The middle portions of the bolster cross arms and the middle portions of the frame intermediate transoms are approximately at the same level as indicated in Figure 2.

Each transom 14, 15 is of box cross section and is provided with a depending web 27 intermediate the sides of the truck. The intermediate portion of each transom 14, 15 is offset toward the center wheel and axle assembly to position depending web 27 nearer to the middle axle and thereby accommodate the brake operating mechanisms, supported from the intermediate portion of the transom, without increasing the wheel base, as would be necessary if the transom with web 27 extended in a straight line transversely of the truck. The intermediate portion of each transom is also made wider and shallower to accommodate the hand brake bell crank described below. Web 27 on transom 15 has a pair of bracket flanges 28 extending toward the adjacent end axle 3 with their outer edges arcuate in shape to fit about a cylindrical hanger box which includes a body 29 and a removable cap 30. A hanger tube 31 extends through box 29, 30 and projects beyond the ends thereof and mounts hanger arms 32 on its ends. A rubber lining L seats tube 31 in the box and provides for pivoting of the hanger arms relative to the body. A brake frame 33 is carried by hanger arms 32 and extends from side to side of the truck with torque arms 34 secured to its ends and embracing upwardly and downwardly facing elements upon the journal boxes 10 to hold frame 33 against rotation when brakes are applied. A bracket 35 extends upwardly from frame 33 and mounts the fulcrum pins 37 for the brake levers 38. The levers extend from their fulcrum pins toward the associated disc where they carry friction shoes 39. The levers also extend from their fulcrum pins toward the center transom and carry respectively the ends of a brake cylinder 40 and a piston rod 41. Upon admission of fluid to cylinder 40 the inner ends of the levers are moved apart and the outer ends are moved together to thrust the brake shoes against the brake discs.

On the side of web 27 opposite to bracket flanges 28 are similar flanges 42 which mount a hanger box 43 carrying a hanger tube 44 with hanger arms 45 and brake frame tube 46 with fulcrum seats 47, brake levers 48 and brake shoes 49, all similar to the brake gear mounted upon the brackets 28.

Hanger box 43 and brake cylinder 50 are positioned beneath bolster cross arm 22 and above the level of spring plank 19 which is offset longitudinally of the truck intermediate its ends to increase the clearance between it and the hanger box and brake cylinders. The brake gear described is duplicated on the opposite side of the longitudinal center line of the truck.

Pivoted to brake cylinder 40 is a hand brake bell crank lever 51. A connecting rod 52 is pivoted to piston rod 41 and has a pin and slot connection to lever 51. A chain 53 extends from lever 51 to a suitable drum or other hand operated tightening device (not shown) on the vehicle body. Chain 53 passes over box 29, 30 and under the shallow box structure of the transom. The hand brake may be duplicated at the other end of the truck.

Axle 3 mounts a gear assembly 55 including a housing having a torque arm 56, the outer end of which is seated in a bracket on end transom 17. A drive shaft 57 has a universal joint connection to the gear assembly and extends from the gear unit to an electric generator (not shown) mounted on the vehicle body.

The positioning of the truck bolster longitudinally of the truck frame is maintained by anchors 60, each connected at its end to a bracket 61 on the truck frame and to a bracket 62 on the bolster cross arm. The action of the bolster springs is controlled by telescoping shock absorbers 63, each of which is connected at its upper end to a horizontal extension 64 on the bolster cross arm and at its lower end to a bracket 65 on the end of spring plank 19.

Figures 6, 7, and 8 illustrate another arrangement for supporting the bolster from the truck frame which avoids use of the spring planks previously described. In this arrangement each pair of hangers 70 are suspended from brackets 71 extending outwardly from wheel pieces 72, similar to the arrangement previously described. Each pair of hangers supports a spring seat 73 having upright flanges 74 facing inwardly of the truck. A coil spring 75 is mounted in seat 73 and supports the end of the bolster cross arm 76 which has a depending bracket 77 including upright flanges 78 opposing spring seat bracket flanges 74, whereby the bolster forms a spacer between spring seats 73 at opposite sides of the truck. Contact between opposing flanges on the spring seat and bolster brackets is maintained by the inclination of hangers 70.

Bolster bracket 77 has a downwardly facing horizontal web 79 overlying the equalizer 80 and forming a safety device for supporting the bolster in the event of the failure of the adjacent spring or a spring hanger. A longitudinal member 81 extends between the outer ends of cross arms 76 and preferably is formed integral therewith and includes a side bearing 82 at the transverse center line of the truck. If desired, however, the longitudinal member 81 may be formed separately and rigidly secured to the ends of the cross arms 76. The positioning of the side bearing 82 outwardly of the wheel pieces provides for greater accessibility and clearance for the disc brake mechanism for the center wheel and axle assembly.

Figure 10 illustrates a modification of the bolster support shown in Figures 6-9, in which each bolster cross arm 90 similarly acts as a spacer for the bolster spring seats 91 at opposite sides of the truck. Each spring seat includes a bracket 92 intermediate the upright flanges 93 and extending inwardly of the truck over the equalizer 94 and terminating in a part having a vertical slot 95 which receives a pin 96 secured to the bolster. If the swing hanger or bolster spring breaks the bracket 92 will be held by pin 96 to prevent outward movement of the spring seat and to hold the spring seat in level position and the spring seat will be limited in its downward movement by the engagement of the bracket with the equalizer.

The fact that the bolster coil springs and swing hangers are positioned outwardly of the wheel pieces, the fact that the truck frame single center transoms are offset toward the center wheel and axle assembly, the fact that the bolster cross arm center portions are offset toward the center wheel and axle assembly, and the fact that the spring plank is also offset similarly, provide for a truck with a minimum wheel base and for the application of disc brakes to all three axles with the application of the brakes on the end axles similar to the application of disc brakes to a four wheel truck. A satisfactory minimum wheel base cannot be obtained if the truck bolster is supported by the truck frame inwardly of the wheel pieces, for instance by swing hangers located inwardly of the wheel pieces as such supporting structure would interfere with the brake parts and with the truck frame transom and bolster cross arm arrangements.

In all forms of the invention the positioning of the swing hangers on the outside of the truck wheel pieces is a safety factor because, if a swing hanger breaks and falls from the truck, it will fall outwardly of the rail and is not likely to fall on the rail and cause derailment as might result from the falling of hangers suspended from the inner sides of the wheel pieces.

In all forms of the invention, the portions of the truck frame which mount the bolster and the brake gear and the gear housing are so disposed relative to each other and to the equipment mounted on the truck that the parts may function as in a truck with the usual arrangement of brakes applied to the wheels, but the over-all length of the truck is not affected nor are any of the usual items of truck equipment eliminated or specially constructed because of the disc brake arrangement.

The details of the structure may be varied other than as shown and some of the features may be omitted without departing from the spirit of the invention and the exclusive use of those modifications coming within the scope of the claims is contemplated.

What is claimed is:

1. In a railway vehicle truck, three wheel and axle assemblies each having a braking disc, a truck frame supported from said assemblies and including a transverse transom positioned intermediate the middle assembly and an end assembly, and brake structure associated with each assembly and comprising friction shoes movable transversely of the truck to engage said discs, levers for operating said shoes, means for moving said levers, said brake structures being mounted on said transom exclusively.

2. In a railway vehicle truck, three wheel and axle assemblies, individual disc brake structure associated with each assembly and including a fluid cylinder and brake levers, and a truck frame supported on said assemblies and including spaced transoms extending transversely of the truck, one of said transoms mounting the fluid cylinders and the levers for the brake structures on two of said assemblies.

3. In a railway vehicle truck, wheel and axle assemblies, a truck frame supported therefrom and including spaced transverse transoms, a bolster spring-supported from said frame and including spaced cross arms adjacent to said transoms, at least one of said transoms supporting a bracket near the center of the truck, and a brake operating mechanism mounted on said bracket beneath the adjacent cross arm.

4. In a railway vehicle truck, three wheel and axle assemblies each having a braking disc, a truck frame supported from said assemblies and including a transverse transom positioned intermediate the middle assembly and each end assembly, a bolster carried by said transoms, brake cylinders and levers carried by one of said transoms, some of the levers extending alongside of the disc on the middle assembly and beneath said bolster and some of the levers extending alongside the disc on the adjacent end assembly, said levers being provided with brake shoes for engaging the corresponding discs.

5. In a railway vehicle truck, three wheel and axle assemblies each having a braking disc, a truck frame suspended from said assemblies and including wheel pieces at the sides of the truck and a transverse transom positioned intermediate the middle assembly and each end assembly, pairs of swing hangers suspended from brackets on the outside of said wheel pieces, at least one of the hangers of each pair being abreast of the adjacent transom, spring planks carried by said swing hangers, and a body supporting bolster having cross arms spring-supported upon said spring planks, brake structure for the middle assembly and an end assembly mounted on one of said transoms and brake structure for the other end assembly mounted on the other transom.

6. A railway vehicle truck as described in claim 2, which includes swing hangers suspended from the truck frame, at least some of said hangers being opposite the ends of the frame transoms, a spring plank suspended at its ends from said hangers at opposite sides of the truck and being offset longitudinally of the truck between its ends, brake operating mechanisms carried on said transom and positioned at opposite sides of the offset portion of said spring plank.

7. In a railway vehicle truck, three wheel and axle assemblies, the middle assembly at least including a pair of brake discs spaced inwardly from the wheels, a truck frame carried on said assemblies and including wheel pieces, a bolster yieldingly supported from said frame and including a center member extending longitudinally of the truck and provided with spaced cross arms at opposite sides of the middle axle, a longitudinal member on each side of and spaced from said center member and carried by said arms and extending above the brake discs on the middle axle, a center plate on the center longitudinal member above the middle axle and intermediate the brake discs on that axle, and side bearings on the other longitudinal members.

8. In a railway vehicle truck frame, wheel pieces, a transverse transom extending between said wheel pieces and being of box section, said transom being relatively deep near said wheel pieces and relatively shallow intermediate said wheel pieces, a vertical web depending from the relatively shallow portion of said transom and extending transversely of the truck, and brake mounting brackets on opposite sides of said web extending therefrom longitudinally of the truck, at least one of said brackets being beneath the transom box section.

9. In a railway vehicle truck frame, wheel pieces, a transverse transom rigid with and extending between said wheel pieces and being of box section, said transom having a central portion presented downwardly of the end portions thereof, a relatively short vertical web depending from one side of said lower central portion of the transom and extending lengthwise of the transom and provided with a brake gear supporting bracket directly beneath said box section.

10. In a railway vehicle truck, a wheel and axle assembly, a truck frame supported in part from said assembly and including a transverse transom of box-like cross section, a relatively short plate depending from the side of said section remote from said assembly, a brake structure associated with said assembly and including a fluid cylinder with piston and brake lever connections supported from said plate and directly beneath said transom box-like section.

11. In a railway vehicle truck, a wheel and axle assembly, a truck frame supported in part from said assembly and including a transverse transom of box-like cross section, a brake structure associated with said assembly and including a fluid cylinder with piston and brake lever connections positioned directly beneath and supported from said transom box-like section.

12. In a railway vehicle truck, three wheel and axle assemblies, each provided with brake discs, a truck frame supported from said assemblies and including wheel pieces and center transoms between said wheel pieces spaced apart longitudinally of the truck, brake shoes for said discs and operating mechanism mounted on said transoms inboard of said wheel pieces, brackets on said wheel pieces extending outwardly thereof adjacent the connections of said transoms with said wheel pieces, swing hangers supported from said brackets, spring planks spaced longitudinally of the truck and supported from said swing hangers and extending outwardly of said wheel pieces, springs mounted on the end portions of said spring planks, a bolster supported by said springs and comprising spaced cross arms and structure connecting the intermediate portions of said cross arms and provided with a body supporting center plate, the bolster including side bearing arms extending above the middle wheel and axle assembly and the brake discs thereon.

13. In a railway vehicle truck, three wheel and axle assemblies, each provided with brake discs, a truck frame supported from said assemblies and including wheel pieces and center transoms between said wheel pieces spaced apart longitudinally of the truck, brake shoes for said discs and operating mechanism mounted on said transoms inboard of said wheel pieces, springs supported by said frame at points outwardly of said wheel pieces, a bolster supported by said springs and comprising spaced cross arms and structure connecting the intermediate portions of said cross arms and provided with a body supporting center plate, the bolster including side bearing arms extending above the middle wheel and axle assembly and the brake discs thereon.

14. A railway vehicle truck as described in claim 13 in which the brake operating mechanisms are provided with torque arms engaging the end portions of the wheel and axle assemblies outwardly of the wheels.

15. A railway vehicle truck as described in claim 13 in which the center frame transoms are offset at their middle portion toward the center wheel and axle assembly and support the brake operating mechanism from the offset portions, and in which the bolster cross members are also offset at their middle portions toward the center wheel and axle assembly, the middle portions of the frame transoms and bolster cross members being approximately at the same level.

16. In a railway vehicle truck, three wheel and axle assemblies, the middle assembly at least including a pair of brake discs spaced inwardly from the wheels, a truck frame carried on said assemblies and including wheel pieces, a bolster supported from said frame, the bolster including spaced cross arms at opposite sides of the middle axle and extending outwardly beyond the wheel pieces and supported at their outer ends from said frames, a longitudinal member on each side of the truck outwardly of said wheel pieces and mounted on and between the end portions of said cross arms and provided with a side bearing intermediate its end portions outwardly of the brake disc, and a center plate on the bolster above the middle axle and intermediate the brake discs on that axle.

17. In a railway vehicle truck frame, wheel pieces, a transverse transom extending between said wheel pieces and being of box-like cross section which is wider and shallower intermediate the ends of the transom and there provided with a depending vertical web provided with a brake gear supporting bracket beneath the box section.

18. In a railway vehicle truck, three wheel and axle assemblies each having a braking disc, a truck frame supported from said assemblies and including wheel pieces at the sides of the truck and transverse transoms connecting said wheel pieces and positioned intermediate the middle assembly and each end assembly, said transoms being of box section and having a depending web extending transversely of the truck, a first bracket extending from said web towards the middle assembly, a second bracket extending from said web toward the adjacent end assembly, a brake hanger box carried by each bracket, hanger arms supported by each box, an elongated tube carried by each group of hanger arms and extending from side to side of the truck and between adjacent wheels, torque arms carried by the ends of each tube and engaging an adjacent assembly, a set of brake levers fulcrumed on each tube, a fluid cylinder and piston mounted on adjacent ends of the levers of each set with the axis thereof disposed lengthwise of the associated tube, shoes on the other ends of said levers, and brake discs carried on said assemblies in opposed relation to corresponding shoes.

19. In a railway vehicle truck, three wheel and axle assemblies provided with individual brake discs, a truck frame supported by said assemblies and including side members and spaced transverse transoms, each positioned between the middle assembly and one of the end assemblies, a load-carrying bolster supported by the transoms and including transverse members extending alongside of the transoms, a bracket projecting from one transom towards the adjacent end assembly, a bracket projecting from said one transom towards the middle assembly and beneath the corresponding bolster transverse member, brake operating mechanism carried by each bracket and comprising a fluid cylinder with its axis disposed transversely of the truck, cooperating levers at the ends of the cylinders and provided with fulcrums supported by the corresponding brackets, there being brake shoes associated with the levers and the brake discs on the middle assembly and on the adjacent end assembly.

References Cited in the file of this patent

UNITED STATES PATENTS

| | | |
|---|---|---|
| 1,149,181 | Burnett | Aug. 10, 1915 |
| 2,023,714 | Taylor | Dec. 10, 1935 |
| 2,374,218 | Ledwinka | Apr. 24, 1945 |
| 2,374,739 | Frede | May 1, 1945 |
| 2,384,459 | Eksergian | Sept. 11, 1945 |
| 2,475,327 | Keller | July 5, 1949 |
| 2,594,734 | Cripe | Apr. 29, 1952 |
| 2,637,279 | Charlton et al. | May 5, 1953 |